United States Patent
Lv et al.

(10) Patent No.: US 9,026,607 B2
(45) Date of Patent: May 5, 2015

(54) PROMULGATING INFORMATION ON WEBSITES USING SERVERS

(75) Inventors: Kaili Lv, Hangzhou (CN); Jian Deng, Hangzhou (CN); Bingyang Hua, Hangzhou (CN); Zengguang Liu, Hangzhou (CN); Chaofeng Meng, Hangzhou (CN); Jie Su, Hangzhou (CN); Jun Tang, Hangzhou (CN); Zheng Zhang, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

(21) Appl. No.: 12/600,989

(22) PCT Filed: Jun. 8, 2009

(86) PCT No.: PCT/US2009/046593
§ 371 (c)(1),
(2), (4) Date: Nov. 19, 2009

(87) PCT Pub. No.: WO2009/149446
PCT Pub. Date: Dec. 10, 2009

(65) Prior Publication Data
US 2011/0066697 A1    Mar. 17, 2011

(30) Foreign Application Priority Data
Jun. 6, 2008    (CN) .......................... 2008 1 0110612

(51) Int. Cl.
*G06F 15/16*    (2006.01)
*G06F 17/30*    (2006.01)
*G06Q 30/02*    (2012.01)

(52) U.S. Cl.
CPC ............ *G06F 17/3089* (2013.01); *G06Q 30/02* (2013.01)

(58) Field of Classification Search
CPC .............................. G06Q 30/02; G06F 17/3089
USPC .................................................. 709/217, 219
See application file for complete search history.

(56) References Cited

U.S. PATENT DOCUMENTS 5,799,284 A * 8/1998 Bourquin .................... 705/14.54
6,611,861 B1   8/2003 Schairer et al.
(Continued)

FOREIGN PATENT DOCUMENTS

CN    101146092 A    3/2008
JP    2001331449    11/2001
(Continued)

OTHER PUBLICATIONS

The Chinese Office Action mailed Sep. 29, 2011 for Chinese Patent Application No. 200810110612.0 a counterpart foreign application of U.S. Appl. No. 12/600,989, 15 pages.
(Continued)

*Primary Examiner* — Kostas Katsikis
(74) *Attorney, Agent, or Firm* — Van Pelt, Yi & James LLP

(57) ABSTRACT

A method uses web servers to promulgate information from one server to another, instead of promulgating the information by the user to each server individually. A first server receives a first request for promulgating web-information from a user, locally promulgates the web-information, and sends a second request to at least one second website server to instruct the second website server to locally promulgate the web-information. The selection of the second server is done according to a preset configuration file which includes a relationship mapping between the first website server and the second website server. The relationship mapping may provide the user information related to the second website server based on the user information related to the first website server. The present disclosure further discloses a communication apparatus and a communication system.

20 Claims, 3 Drawing Sheets

(56) References Cited

U.S. PATENT DOCUMENTS

| | | | |
|---|---|---|---|
| 6,654,807 B2* | 11/2003 | Farber et al. | 709/225 |
| 6,999,991 B1* | 2/2006 | Ikeda | 709/206 |
| 7,359,963 B1* | 4/2008 | Huang et al. | 709/223 |
| 7,620,699 B1* | 11/2009 | Scherer et al. | 709/219 |
| 7,827,298 B2* | 11/2010 | Black et al. | 709/231 |
| 8,566,248 B1* | 10/2013 | Steele et al. | 705/60 |
| 2002/0046286 A1* | 4/2002 | Caldwell et al. | 709/229 |
| 2002/0078004 A1* | 6/2002 | Ambrosini et al. | 707/1 |
| 2003/0069924 A1 | 4/2003 | Peart et al. | |
| 2003/0144924 A1* | 7/2003 | McGee | 705/27 |
| 2003/0191970 A1* | 10/2003 | Devine et al. | 713/201 |
| 2004/0111473 A1* | 6/2004 | Lysenko et al. | 709/206 |
| 2004/0167989 A1* | 8/2004 | Kline et al. | 709/245 |
| 2004/0210771 A1 | 10/2004 | Wood et al. | |
| 2005/0024677 A1* | 2/2005 | Miura et al. | 358/1.15 |
| 2005/0278300 A1 | 12/2005 | Kato | |
| 2006/0047547 A1* | 3/2006 | Ekker et al. | 705/8 |
| 2006/0080183 A1* | 4/2006 | Cicotelli | 705/26 |
| 2006/0095333 A1 | 5/2006 | Gambhir | |
| 2006/0179111 A1 | 8/2006 | Verona | |
| 2006/0215842 A1* | 9/2006 | Okamoto | 381/58 |
| 2006/0271689 A1* | 11/2006 | Kikuchi | 709/227 |
| 2007/0027754 A1 | 2/2007 | Collins et al. | |
| 2007/0027864 A1 | 2/2007 | Collins et al. | |
| 2007/0038673 A1* | 2/2007 | Broussard et al. | 707/104.1 |
| 2007/0078772 A1 | 4/2007 | Dadd | |
| 2007/0180380 A1* | 8/2007 | Khavari et al. | 715/704 |
| 2007/0185775 A1* | 8/2007 | Lawton | 705/26 |
| 2007/0214075 A1 | 9/2007 | Ablan | |
| 2007/0233565 A1 | 10/2007 | Herzog et al. | |
| 2007/0288595 A1 | 12/2007 | Cohen | |
| 2008/0004992 A1* | 1/2008 | King et al. | 705/27 |
| 2008/0082415 A1* | 4/2008 | Shastry | 705/14 |
| 2008/0189617 A1 | 8/2008 | Covell et al. | |
| 2008/0208969 A1 | 8/2008 | Van Riel | |
| 2008/0235139 A1 | 9/2008 | Magschok | |
| 2008/0313260 A1 | 12/2008 | Sweet et al. | |
| 2009/0099861 A1* | 4/2009 | Aziz et al. | 705/1 |
| 2009/0164884 A1* | 6/2009 | Watson | 715/234 |
| 2009/0254437 A1* | 10/2009 | Lee et al. | 705/14.69 |
| 2009/0282343 A1* | 11/2009 | Catlin et al. | 715/738 |

FOREIGN PATENT DOCUMENTS

| | | |
|---|---|---|
| JP | 2003323409 | 11/2003 |
| JP | 2005278195 | 10/2005 |
| JP | 2005316786 | 11/2005 |
| JP | 2007036845 | 2/2007 |
| JP | 2008083803 | 4/2008 |
| KR | 20010094145(A) | 10/2001 |
| WO | WO0231698 | 4/2002 |

OTHER PUBLICATIONS

The Chinese Office Action mailed Aug. 30, 2012 for Chinese Patent Application No. 200810110612.0 a counterpart foreign application of U.S. Appl. No. 12/600,989, 9 pages.

Translated the Japanese Office Action mailed Mar. 19, 2013 for Japanese patent application No. 2011-512732, a counterpart foreign application of U.S. Appl. No. 12/600,989, 4 pages.

The Chinese Office Action mailed Jan. 6, 2012 for Chinese Patent Application No. 200810110612.0 a counterpart foreign application of U.S. Appl. No. 12/600,989, 15 pages.

The Extended European Search Report mailed Jan. 21, 2013 for European patent application No. 09759604.3, 6 pages.

The Chinese Office Action mailed Mar. 12, 2013 for Chinese Patent Application No. 200810110612.0 a counterpart foreign application of U.S. Appl. No. 12/600,989, 14 pages.

Translated the Japanese Office Action mailed Jul. 16, 2013 for Japanese patent application No. 2011-512732, a counterpart foreign application of U.S. Appl. No. 12/600,989, 5 pages.

Translated the Japanese Office Action mailed Dec. 3, 2013 for Japanese patent application No. 2011-512732, a counterpart foreign application of U.S. Appl. No. 12/600,989, 6 pages.

* cited by examiner

30

| 300 | USER CLIENT 10 SENDS THE FIRST REQUEST TO FIRST WEBSITE SERVER 11, WHEREIN THE THE FIRST REQUEST INCLUDES IDENTIFIER A AND PASSWORD A THAT ARE USED FOR LOGGING IN THE FIRST WEBSITE SERVER 11 BY THE USER CLIENT 10. |

↓

310 — THE FIRST WEBSITE SERVER 11 VERIFIES IDENTITY OF THE USER CLIENT 10 BASED ON THE IDENTIFIER A AND THE PASSWORD A.

↓

320 — UPON SUCCESSFUL IDENTITY VERIFICATION OF THE USER CLIENT 10, THE FIRST WEBSITE SERVER 11 LOCALLY PROMULGATES THE PRODUCT INFORMATION OF THE USER.

↓

330 — THE FIRST WEBSITE SERVER 11 OBTAINS NON-LOCAL USER IDENTIFIERS AND USER PASSWORDS THAT CORRESPOND TO THE VERIFIED IDENTIFIER A, AS WELL AS WEB ADDRESSES WHERE THE NON-LOCAL USER IDENTIFIER(S) AND USER PASSWORDS ARE USED.

↓

340 — THE FIRST WEBSITE SERVER 11 SEPARATELY SENDS A SECOND REQUEST TO EACH SECOND WEBSITE SERVER 12.

↓

350 — EACH OF THE SECOND WEBSITE SERVERS 12 RECEIVES THE SECOND REQUEST FROM THE FIRST WEBSITE SERVER 11, AND PERFORMS IDENTITY VERIFICATION OF THE USER CLIENT 10 BASED ON THE USER IDENTIFIER AND USER PASSWORD INCLUDED.

↓

360 — UPON VERIFYING THE IDENTITY OF THE USER CLIENT 10, EACH OF THE SECOND WEBSITE SERVERS 12 SEPARATELY PROMULGATES THE PRODUCT INFORMATION (WHICH HAS BEEN PROMULGATED ONCE BY THE FIRST WEBSITE SERVER IN BLOCK 320) LOCALLY.

Fig. 3

PROMULGATING INFORMATION ON WEBSITES USING SERVERS

RELATED APPLICATIONS

This application is a national stage application of international patent application PCT/US09/46593 filed Jun. 8, 2009, entitled "PROMULGATING INFORMATION ON WEBSITE USING SERVERS" which claims priority from Chinese patent application, Application No. 200810110612.0, filed Jun. 6, 2008, entitled "METHOD, APPARATUS AND SYSTEM FOR PROMULGATING INFORMATION ON WEBSITE", which applications are hereby incorporated in their entirety by reference.

TECHNICAL FIELD

The present disclosure relates to fields of communication, and particularly to methods, apparatuses and systems for promulgating information on websites.

BACKGROUND

In existing online marketing process, enterprises generally promulgate company-related information (such as product information) to a number of e-commerce websites with a view to promote purchase interests of the public or collaboration interests of needed providers. As a result, promulgating company-related information to various e-commerce websites to acquire a full information exposure has become an essential procedure in the online marketing process.

However, under existing technologies, if company-related information is promulgated among multiple e-commerce websites, user is required to repeat the same operations on these e-commerce websites in order to complete the promulgation of the company-related information. The redundant operations not only make the process cumbersome, but also greatly reduce the work efficiency of information promulgation.

SUMMARY OF THE DISCLOSURE

Disclosed is a method, an apparatus and a system for promulgating information on website to simplify the process of promulgating the same web-information to multiple website servers.

The method promulgates information from one server to another, instead of promulgating the information from the user to each server individually. A first server receives a first request for promulgating web-information from a user, locally promulgates the web-information, and sends a second request to at least one second website server to instruct the second website servers to locally promulgate the web-information. As a result, to promulgate the same web-information to multiple websites, a user only needs to request promulgation once on the first website server, thus avoiding redundant and cumbersome operations. This significantly improves the efficiency and user experience.

The selection of the second server is done according to a preset configuration file which includes a relationship mapping between the first website server and the second website servers. The relationship mapping may provide the user information related to the second website servers based on the user information related to the first website server. The relationship mapping may contain a mapped correspondence between the user information related to the first website server and the user information related to the second website servers. The related user information may contain a combination of any one or more of user identifier, user password, a device web-address, and a device identifier.

Upon receiving the first request, the first website server may verify the identity of the user based on related user information included in the first request. Upon receiving the second request, the second website servers may also verify the identity of the user based on related user information included in the second request.

The apparatus for promulgating information has a storage unit, a receiving unit, a processor, and a sending unit. The storage unit is adapted for storing a preset configuration file including a relationship mapping between the apparatus and at least one additional promulgating apparatus. The receiving unit is adapted for receiving a first request for promulgating web-information from a user. The processor is adapted for locally promulgating the web-information and for creating a second request used for instructing the other promulgating apparatus to promulgate the web-information according to the configuration file. The sending unit adapted for sending the second request to the at least one additional promulgating apparatus.

Another aspect of the disclosure is a communication system including a first website server and multiple second website servers. The first website server is adapted for receiving a first request from a user, locally promulgating the web-information, and sending a second request according to a configuration file contained therein. The second website servers are adapted for receiving the second request from the first website server, and locally promulgating the web-information. The first website server selects at least one second website server among the second website servers according to a preset configuration file as recipient of the second request.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF DRAWINGS

The detailed description is described with reference to the accompanying figures. In the figures, the use of the same reference numbers in different figures indicates similar or identical items.

FIG. 3 shows a flow chart illustrating promulgating web-information by a user in accordance with the exemplary embodiments of the present disclosure.

DETAILED DESCRIPTION

According to the exemplary embodiments described herein, a method to simplify a user process of promulgating the same web-information to multiple website servers is disclosed. A first website server promulgates the web-information locally upon receiving from a user a first request for promulgating the web-information. According to a preset configuration file, the first website server sends a second request to at least one second website server, and instructs the second website server(s) to locally promulgate the web-information. The configuration file includes a relationship mapping between the first website server and the second website server(s). As a result, to promulgate the same web-information to multiple websites, the user only needs to execute a promulgation operation once, thus avoiding redundant and cumbersome operations. The work efficiency and the user experience are therefore improved.

Exemplary embodiments of the present disclosure are described in details using accompanying figures.

Figure 1:
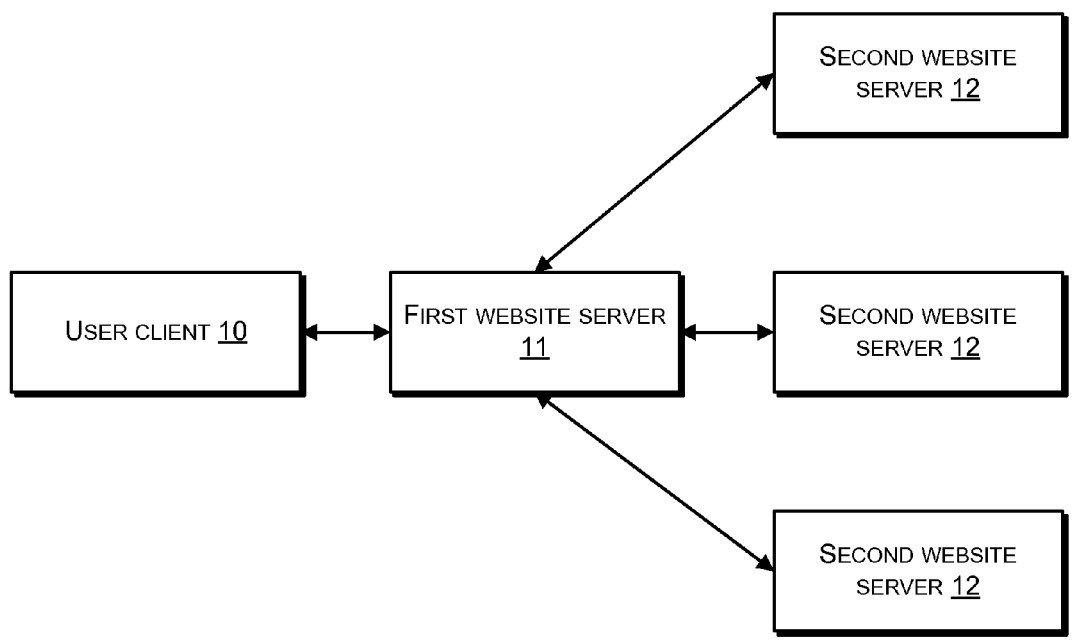
FIG. 1 shows a schematic diagram illustrating architecture of an exemplary communication system in accordance with the present disclosure.

FIG. 1 shows an exemplary communication system 5, which includes a user client 10, a first website server 11, and at least one second website server 12.

The user client 10 is used for sending a first request for promulgating web-information to a first website server 11. The first website server 11 is used for receiving the first request from the user client 10, and locally promulgating the web-information. The first website server 11 is further used for sending a second request to at least one second website server 12 according to a preset configuration file to instruct the second website server(s) to locally promulgate the web-information. The configuration file includes a relationship mapping between the first website server 11 and the second website servers 12.

The second website server 12 is used for receiving the second request from the first website server 11, and locally promulgating the web-information.

In one embodiment, the first website server 11 works as self-contained apparatus for promulgating information. The first website server 11 contains a comprehensive relationship mapping to all desired additional promulgating apparatuses second servers and other web devices that are desired to receive the web-information and promulgate the web-information locally. There is no need for a second server to further promulgate the web-information to other servers requesting further promulgation.

In another embodiment, at least some second website servers 12 are configured as a promulgating apparatus in a way similar to how the first website server 11 is configured. The second website servers 12 configured in this manner are capable of further promulgating the web-information to other servers requesting additional local promulgation or additional networked promulgation.

It is noted that although illustrated as website servers, the first website server 11 may be replaced by a server that does not host a website but is designed for promulgating information to networked website servers (e.g., the second website servers 12). At least some of the second website servers 12 may be replaced by a suitable promulgation apparatus which is not necessarily a website server hosting a website. A suitable promulgation apparatus should generally be a valuable target for promulgating web-information.

Figure 2:
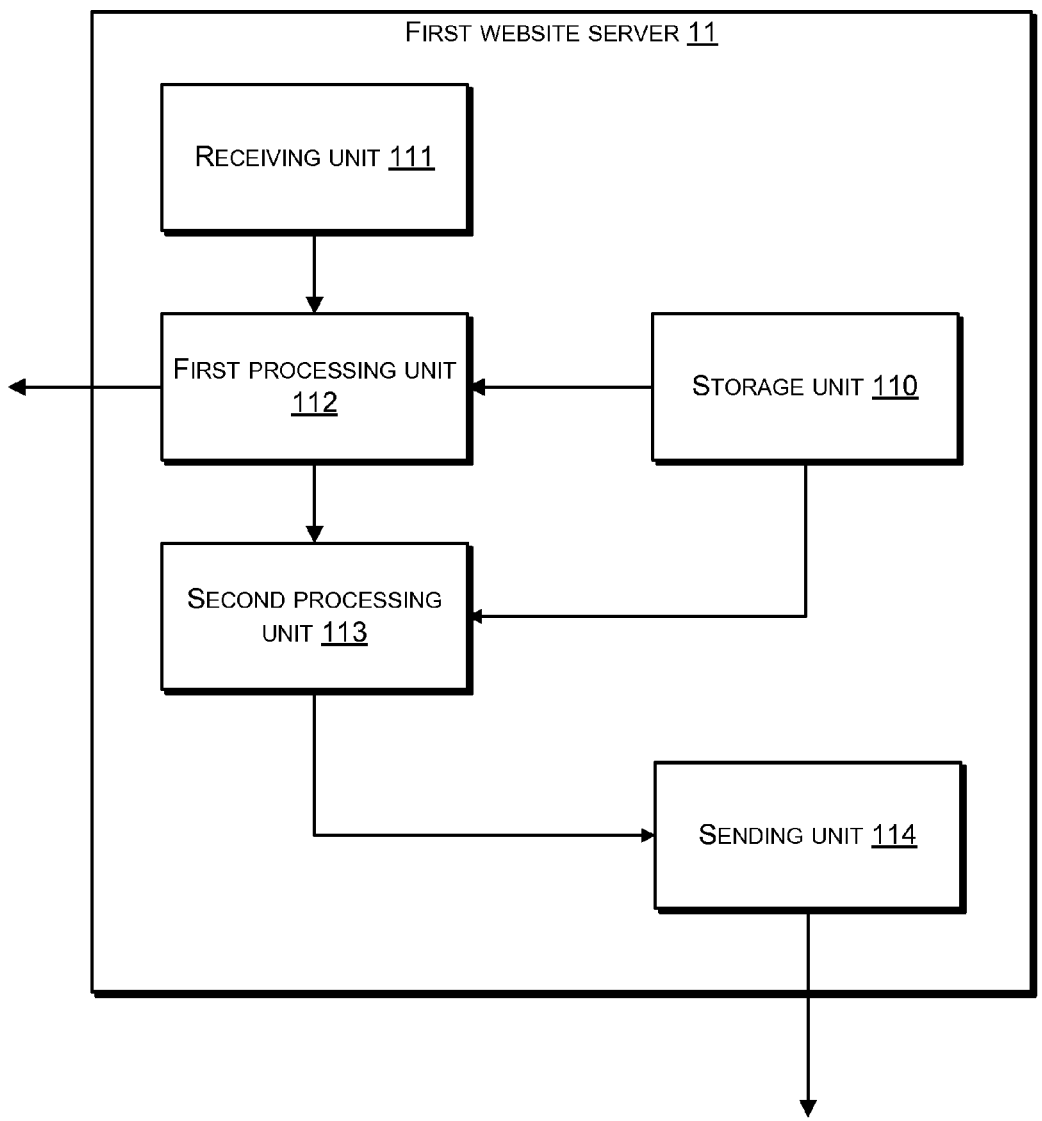
FIG. 2 shows a structural diagram illustrating functions of an exemplary first website server in accordance with the present disclosure.

FIG. 2 shows an exemplary first website server 11, which includes a storage unit 110, a receiving unit 111, a first processing unit 112, a second processing unit 113, and a sending unit 114. In the present disclosure, a "unit" in general refers to a functionality designed to perform a particular task or function. A unit can be a piece of hardware, software, a plan or scheme, or a combination thereof, for effectuating a purpose associated with the particular task or function. In certain circumstances, multiple units may be embodied in a single hardware or software component which performs multiple functions.

The storage unit 110 is used for storing a preset configuration file, which includes relationship mapping between the first website server 11 and the second website servers 12. The relationship mapping contains a map correspondence between the user information related to the first website server and the user information related to the second website server.

The receiving unit 111 is used for receiving a first request for promulgating web-information from the user client 10. The first processing unit 112 is used for locally promulgating the web-information. The second processing unit 113 is used for creating at least one second request according to the configuration file. The second request is used for instructing the second website servers 12 to promulgate the web-information. The sending unit 114 is used for sending the second request to the second website servers 12.

Based on the above system architecture, the first website server 11 and the second website servers 12 may either have the same functionalities, or have different functionalities. In the exemplary embodiments, the first website server 11 is assumed to be a website server within a company's intranet, while the other second website servers 12 are public website servers (i.e., e-commerce websites).

FIG. 3 is a flowchart of an exemplary process 30 of promulgating the same web-information to multiple second website servers 12 through the first website server 11. In this description, the order in which a process is described is not intended to be construed as a limitation, and any number of the described process blocks may be combined in any order to implement the method, or an alternate method. The process 30 is described as follows.

At Block 300, the user client 10 sends a first request to the first website server 11 to instruct the first website server 11 to locally promulgate certain web-information. The first request includes related user information that is used for the first website server 11 to verify the identity of the user using the user client 10.

The user client 10 may further include in the first request the web-information that is instructed to be promulgated. Alternatively, the user client 10 may send the web-information separately after receiving a feedback confirming successful identity verification from the first website server 11. In the present exemplary embodiment, the first approach is used for illustration.

In a practical application, various forms of the related user information can be used by the user client 10 for identity verification. Examples include user identifier+user password, IP address of the user client 10, and device identifier of the user client 10. In the present exemplary embodiment, user identifier+user password is used by the user client 10 as the related user information.

In the following, it is assumed that the user client 10 has an Identifier A and a Password A with relation to the first website server 11. That is, in the first website server 11, the local identifier and the local password of user client 10 is Identifier A and Password A, respectively.

As shown in TABLE 1, the first website server 11 may store multiple user identifiers and corresponding user passwords for identity verification. Different user identifiers and user passwords are used to identify different individual users.

TABLE 1

| Local User Identifier | Local User Password |
| --- | --- |
| Identifier A | Password A |
| Identifier B | Password B |
| . . . | . . . |

At Block 310, the first website server 11 verifies the identity of the user client 10 based on Identifier A and Password A.

In a practical application, if no identity verification is required for promulgation of web-information in the first website server 11, verification procedures in Blocks 300 and 310 may be omitted.

At Block 320, upon successfully verifying the identity of the user client 10, the first website server 11 locally promulgates the web-information as requested by the user client 10. For the purpose of illustration, in this exemplary embodiment, the web-information that is requested for promulgation by the user client 10 is assumed to be information of outdoor product supplies.

The first website server 11 may promulgate the information of outdoor product supplies in a number of ways. Examples include, but are not limited to, fixed-point play on a web page using FLASH advertising, or publishing on a separate or dedicated web page.

Upon promulgating the information of outdoor product supplies, the first website server 11 may save the information locally or in a designated storage device for backup information. Alternatively, the first website server 11 may delete the information for saving storage space. Specific processing procedures may be pre-determined by the management according to a practical application environment.

At Block 330, the first website server 11 obtains from the relationship mapping non-local user identifiers and non-local user passwords corresponding to the local Identifier A, and web addresses of the places where respective non-local user identifiers and non-local user passwords are used. In this exemplary embodiment, a place where a non-local user identifier and a non-local user password are used refers to one of the second website servers 12.

For example, as shown in TABLE 2, Identifier A, Identifier C, and Identifier D are non-local user identifiers that correspond to the Identifier A. It is noted that the Identifier A may also be used the nonlocal identifier of the same user in other non-local servers. If the same user identifier is used both locally and non-locally, either the same user password or different user passwords may be used for the user identifier locally and non-locally.

TABLE 2

| Local User Identifier | Non-local User Identifier | Non-local User Password | Second Website Server Address |
|---|---|---|---|
| Identifier A | Identifier A | Password A' | Address A |
|  | Identifier C | Password C | Address B |
|  | Identifier D | Password D | Address C |
|  | ... | ... | ... |
| Identifier B | Identifier E | Password E | Address D |
| ... | ... | ... | ... |

As shown in TABLE 2, the Identifier A corresponds to at least three second website servers 12 in this exemplary embodiment. This means that the user identified by the Identifier A on the first website server 11 has a business relationship with (e.g., having a user account) at least three second website servers 12. Therefore, the user may intend to promulgate the same product information on these second website servers 12 as well. In other words, the information of outdoor product supplies of the user client 10, which is promulgated on the first website server 11, needs to be also promulgated on these three second website servers 12.

At Block 340, the first website server 11 sends a second request to each of these three or more second website servers 12 instructing local promulgation of the information of outdoor product supplies. The same information has been promulgated in Block 320.

Depending on the non-local user information, the second request sent to different second website servers 12 may contain different identification information. In the present exemplary embodiment, for example, the second request sent to each of the three second servers 12 includes "identifier A and password A", "identifier C and password C", or "identifier D and password D", respectively.

With reference to Block 300, the first website server 11 may include the information of outdoor product supplies in the second request and send the information along with the second request to the second website servers 12. Alternatively, the first website server 11 may separately send the information of outdoor product supplies after the first website server 11 has received a feedback confirming successful identity verification from the second website server 12. In this exemplary embodiment, the first approach is used for illustration.

At Block 350, each of the second website servers 12 receives the respective second request from the first website server 11, and performs identity verification of the user client 10 based on respective user identifier and user password included in the second request.

At Block 360, upon verifying the identity of the user client 10, each of the second website servers 12 separately promulgates the information of outdoor product supplies locally. The same information has been promulgated in Block 320.

Similar to that in Block 320, upon promulgating the information of outdoor product supplies, the second website server 12 may save the information locally or in a designated storage device for backup information. Alternatively, the second website server 12 may delete the information for saving up storage space. Specific details are not repeated.

In a practical application, if no identity verification is required for promulgation of web-information in any of the second website servers 12, the respective verification procedures in Blocks 350 and 360 may be omitted.

In the above exemplary embodiment, the methods of identity verification in the first website server 11 and the second website servers 12 may or may not be the same. For example, "user identifier+user password" may be used for identity verification in the first website server 11 while "device identifier" is used in any of the second website servers 12. Evidently, the same or different identity verification methods may be used among the second website servers 12. Specific details are not repeated here again.

In a practical application, the first website server 11 and the second website servers 12 in foregoing exemplary embodiments may have the same or similar functionalities, but may also be different in various aspects. For example, both the first website server 11 and the second website server 12 may be public website servers. The user client 10 may promulgate the web-information in one of the website servers to trigger the website server to instruct other website servers (with which the user client 10 has registered) to locally promulgate the same web-information separately.

The foregoing Blocks 300-360 assumes for the purpose of illustration that the first website server 11 is a company internal website server and the second website servers 12 are public website servers or website servers of other companies. If both the first and the second website servers are public website servers, procedures are similar to the above and will not be described here again.

As indicated above, the first website server has a desired configuration file containing the necessary relationship mapping that relates a user registered with the first website server to the second website servers. As long as the relationship mapping is sufficiently complete, there may be no need for further promulgation from the second website servers to any subsequent layers of website servers (e.g., third website servers). Nevertheless, in principle, multiple layer promulgation is possible given proper considerations to server selectivity from one layer to the other (e.g., implementation of rules that prevent backward promulgation of information from a website server to any website server that has already performed local promulgation of the same information).

On the other hand, the first website server 11 may send the second requests only to selected second website servers 12 based on the content of web-information. For example, the web-information may be that of a product of certain type. Users may have a variety of web-information for various types of products. The web-information of a certain type of products may be sent to a subset of second website servers that are particularly suited for promulgating the web-information of this type of products.

An example definition of information types is shown in Table 3.

TABLE 3

| Information Type | Information Content |
|---|---|
| Type X | Kitchen Products |
| Type Y | Sanitary and Bath Products |
| Type Z | Outdoor Products |
| ... | ... |

According to TABLE 3, if the first website server 11 receives a request containing a type identifier "Y" from the user client 10, the first website server 11 may selectively send out the second request to related second website servers 12 according to configuration information that is shown in Table 4:

TABLE 4

| Information Type | Related User Information | Web Address |
|---|---|---|
| Type X | Identifier A/Password A | Address A |
|  | Identifier B/Password B | Address B |
|  | ... | ... |
| Type Y | Identifier C/Password C | Address C |
| Type Z | Identifier D/Password D | Address D |
| ... | ... | ... |

According to the above TABLE 4, Type Y products are suited for information promulgation on a website identified by "Address C". The first website server therefore sends the second request to a second server hosting the website identified by "Address C". The second request may include the related non-local user information Identifier C/Password C associated with website. Each product type may correspond to multiple websites.

In conclusion, in the exemplary embodiments of the present disclosure, the first website server 11 receives a first request for promulgating web-information from the user client 10, and promulgates the web-information locally. The first website server 11 further sends a second request to at least one second website server 12 and instructs the second website server(s) to locally promulgate the web-information according to a preset configuration file. As a result, to promulgate the same web-information to multiple websites, the user only needs to execute the promulgation operation once, thus avoiding redundant and cumbersome operations. The work efficiency and the user experience are therefore greatly improved.

It is appreciated that the potential benefits and advantages discussed herein are not to be construed as a limitation or restriction to the scope of the appended claims.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A method comprising:
receiving, by a first website server from a user, a first request for promulgating web-information, the user being located at a client location;
promulgating, by the first website server, the web-information at a first location, the first location being different from the client location;
storing, by the first website server, a preset configuration file, the preset configuration file including a relationship mapping between the first website server and a plurality of website servers, a first table mapping a user identifier of the user at the first website server to a corresponding user identifier and user password of the user at a second website server from the plurality of website servers, a second table mapping different contents of the web-information to a respective information type from a plurality of information types, and a third table mapping the respective information type to the second website server from the plurality of website servers to identify that the second website server is suited for promulgating the respective information type, wherein the first table, the second table, and the third table are merged and represented in one table;
selecting, by the first website server, a second website server from the plurality of website servers at least based on information type of the web-information; and
sending, from the first website server, a second request to the second website server according to the preset configuration file to instruct the second website server to promulgate the web-information at a second location, the second location being separate from the first location; and
wherein the web-information relates to product information.

2. The method as recited in claim 1, further comprising:
upon receiving the first request, verifying, by the first website server, an identity of the user based on related user information included in the first request.

3. The method as recited in claim 1, wherein the first website server selects the second website server according to a type identifier of the web-information.

4. The method as recited in claim 1, further comprising:
upon receiving the second request, verifying, by the second website server, an identity of the user based on related user information included in the second request.

5. The method as recited in claim 1, wherein the relationship mapping contains a map correspondence between user information related to the first website server and user information related to the second website server.

6. The method as recited in claim 1, further comprising:
upon receiving the second request, verifying, by the second website server, an identity of the user based on user information related to the second website server and included in the second request.

7. The method as recited in claim 2, wherein the related user information comprises a combination of any one or more of a user identifier, a user password, a device web-address, and a device identifier.

8. The method of claim 1, wherein the sending of the second request to the second website server comprises:
   sending a plurality of second requests to a plurality of second website servers to promulgate the web-information,
   wherein each of the plurality of second requests is sent to a corresponding one of the plurality of second website servers.

9. A method comprising:
   storing, by a promulgating information apparatus, a preset configuration file including a relationship mapping between the promulgating information apparatus and a plurality of additional promulgating information apparatuses, a first table mapping a user identifier of the user at the promulgating information apparatus to a corresponding user identifier and user password of the user at a second promulgating information apparatus from the plurality of additional promulgating information apparatuses, a second table mapping different contents of the web-information to a respective information type from a plurality of information types, and a third table mapping the respective information type to the second promulgating information apparatus from the plurality of additional promulgating information apparatuses to identify that the second promulgating information apparatus is suited for promulgating the respective information type, wherein the first table, the second table, and the third table are merged and represented in one table;
   receiving, by the promulgating information apparatus, a first request for promulgating web-information from a user that is located at a client location;
   promulgating, by the promulgating information apparatus, the web-information at a first location that is different from the client location;
   determining, by the promulgating information apparatus, a type of product to which information content of the web-information is related;
   selecting, by the promulgating information apparatus, an additional promulgating apparatuses that is identified to be suited for promulgating the information content at least based on the type of product from the plurality of additional apparatuses;
   creating, by the promulgating information apparatus, a second request used for instructing the additional promulgating apparatus to promulgate the web-information according to the preset configuration file; and
   sending, by the promulgating information apparatus, the second request to the additional promulgating apparatus; and
   wherein the web-information relates to product information.

10. The method as recited in claim 9, further comprising selecting, by the promulgating information apparatus, the additional promulgating apparatus according to a type identifier of the type of product that information content of the web-information is related.

11. The method as recited in claim 9, wherein the relationship mapping contains a map correspondence between user information related to the promulgating information apparatus and user information related to the additional promulgating apparatus.

12. The method as recited in claim 9, wherein the promulgating information apparatus or the additional promulgating apparatus is a web server.

13. The method as recited in claim 9, further comprising:
   verifying, by the promulgating information apparatus, an identity of the user based on related user information included in the first request; and
   promulgating, by the promulgating information apparatus, the web-information locally upon successfully verifying the identity of the user.

14. A communication system, comprising:
   a first website server adapted for:
   receiving a first request from a user for promulgating web-information in a form of a web page at a location different from a location of the user;
   storing a preset configuration file, the configuration file including a first table mapping a user identifier of the user at the first website server to a corresponding user identifier and user password of the user at a second website server from a plurality of website servers, the preset configuration file further including a second table mapping different contents of the web-information to a respective information type from a plurality of information types, the preset configuration file further including a third table mapping the respective information type to the second website server from the plurality of website servers to identify that the second website server is suited for promulgating the respective information type, wherein the first table, the second table, and the third table are merged and represented in one table;
   selecting the second website server from the plurality of website servers according to the preset configuration file; and
   sending a second request to the second website server to promulgate the web-information; and
   wherein the web-information relates to product information.

15. The system as recited in claim 14, wherein upon receiving the first request, the first website server verifies an identity of the user based on related user information included in the first request, and promulgates the web-information locally upon successfully verifying the identity of the user.

16. The system as recited in claim 14, wherein if the first request includes a type identifier of the web-information, the first website server selects the second website server according to the type identifier.

17. The system as recited in claim 14, wherein upon receiving the second request, the second website server verifies an identity of the user based on related user information included in the second request, and promulgates the web-information locally upon successfully verifying the identity of the user.

18. The system as recited in claim 14, wherein the relationship mapping contains a map correspondence between user information related to the first website server and user information related to the second website server.

19. The system as recited in claim 14, wherein the preset configuration file further includes a relationship mapping between the first website server and the plurality of website servers.

20. The system as recited in claim 14, wherein the first website server locates within an intranet and the plurality of website servers are public website servers.

* * * * *